US009088532B1

(12) United States Patent
Dorsey et al.

(10) Patent No.: US 9,088,532 B1
(45) Date of Patent: Jul. 21, 2015

(54) DEVICE INDEPENDENT MESSAGE DISTRIBUTION PLATFORM

(71) Applicant: Twitter, Inc., San Francisco, CA (US)

(72) Inventors: Jack Dorsey, San Francisco, CA (US); Christopher Isaac Stone, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 24 days.

(21) Appl. No.: 13/744,929

(22) Filed: Jan. 18, 2013

Related U.S. Application Data

(63) Continuation of application No. 12/177,589, filed on Jul. 22, 2008, now Pat. No. 8,401,009.

(60) Provisional application No. 60/951,415, filed on Jul. 23, 2007.

(51) Int. Cl.
*H04L 12/28* (2006.01)
*H04L 12/58* (2006.01)
*G06Q 10/06* (2012.01)

(52) U.S. Cl.
CPC .............. *H04L 51/04* (2013.01); *H04L 51/066* (2013.01); *G06Q 10/0631* (2013.01); *H04L 51/36* (2013.01)

(58) Field of Classification Search
USPC .......................... 709/200, 204, 217, 218, 224
See application file for complete search history.

(56) References Cited

U.S. PATENT DOCUMENTS

| | | |
|---|---|---|
| 5,706,211 A | 1/1998 | Beletic et al. |
| 5,745,692 A | 4/1998 | Lohmann, II et al. |
| 6,226,668 B1 | 5/2001 | Silverman |
| 6,275,570 B1 | 8/2001 | Homan et al. |
| 6,301,245 B1 | 10/2001 | Luzeski et al. |
| 6,301,609 B1 | 10/2001 | Aravamudan et al. |
| 6,405,035 B1 | 6/2002 | Singh |

(Continued)

FOREIGN PATENT DOCUMENTS

| | | |
|---|---|---|
| WO | WO 01/80534 A1 | 10/2001 |
| WO | WO 2007/052285 A1 | 7/2006 |

OTHER PUBLICATIONS

"Transit Cooperative Research Program, TCRP Report 92, Strategies for Improved Traveler Information," Transportation Research Board of the National Academies, Multisystems, Inc., 2003, 122 pages, Cambridge, MA.

*Primary Examiner* — Brian O'Connor
(74) *Attorney, Agent, or Firm* — Nixon & Vanderhye, P.C.

(57) ABSTRACT

A system (and method) for device-independent point to multipoint communication is disclosed. The system is configured to receive a message addressed to one or more destination users, the message type being, for example, Short Message Service (SMS), Instant Messaging (IM), E-mail, web form input, or Application Program Interface (API) function call. The system also is configured to determine information about the destination users, the information comprising preferred devices and interfaces for receiving messages, the information further comprising message receiving preferences. The system applies rules to the message based on destination user information to determine the message endpoints, the message endpoints being, for example, Short Message Service (SMS), Instant Messaging (IM), E-mail, web page output, or Application Program Interface (API) function call. The system translates the message based on the destination user information and message endpoints and transmits the message to each endpoint of the message.

21 Claims, 3 Drawing Sheets

(56) References Cited

U.S. PATENT DOCUMENTS

| | | | |
|---|---|---|---|
| 6,408,309 B1 | 6/2002 | Agarwal | |
| 6,463,462 B1 | 10/2002 | Smith et al. | |
| 6,594,345 B1 | 7/2003 | Vinson | |
| 6,633,630 B1 | 10/2003 | Owens et al. | |
| 6,661,340 B1 | 12/2003 | Saylor et al. | |
| 6,665,722 B1 | 12/2003 | Elliott | |
| 6,681,114 B2 | 1/2004 | Chang et al. | |
| 6,694,362 B1 | 2/2004 | Secor et al. | |
| 6,708,217 B1 | 3/2004 | Colson et al. | |
| 6,745,021 B1 | 6/2004 | Stevens | |
| 6,813,634 B1 | 11/2004 | Ahmed | |
| 6,816,878 B1 | 11/2004 | Zimmers et al. | |
| 6,832,341 B1 | 12/2004 | Vijayan | |
| 6,839,562 B2 | 1/2005 | Smith et al. | |
| 6,891,811 B1 | 5/2005 | Smith et al. | |
| 6,965,777 B1 | 11/2005 | Cast et al. | |
| 7,069,308 B2 * | 6/2006 | Abrams | 709/218 |
| 7,116,994 B2 | 10/2006 | Hatch | |
| 7,130,389 B1 | 10/2006 | Rodkey et al. | |
| 7,142,892 B2 | 11/2006 | Dennis et al. | |
| 7,180,415 B2 | 2/2007 | Bankert | |
| 7,209,950 B2 | 4/2007 | Bennet et al. | |
| 7,250,846 B2 | 7/2007 | Ebling et al. | |
| 7,251,696 B1 | 7/2007 | Horvitz | |
| 7,275,102 B2 | 9/2007 | Yeager et al. | |
| 7,330,895 B1 | 2/2008 | Horvitz | |
| 7,333,804 B2 | 2/2008 | Kim | |
| 7,355,990 B2 | 4/2008 | Smith et al. | |
| 7,409,428 B1 | 8/2008 | Brabec et al. | |
| 7,447,901 B1 | 11/2008 | Sullenberger et al. | |
| 7,496,183 B1 | 2/2009 | Rodkey et al. | |
| 7,509,490 B1 | 3/2009 | Hsu et al. | |
| 7,519,165 B1 | 4/2009 | Rodkey et al. | |
| 7,529,795 B2 * | 5/2009 | Arav | 709/204 |
| 7,627,608 B2 * | 12/2009 | Strandell et al. | 1/1 |
| 7,644,144 B1 * | 1/2010 | Horvitz et al. | 709/223 |
| 7,657,458 B2 * | 2/2010 | Calabria | 705/26.61 |
| 7,680,882 B2 * | 3/2010 | Tiu et al. | 709/203 |
| 7,711,786 B2 * | 5/2010 | Zhu et al. | 709/206 |
| 7,720,910 B2 | 5/2010 | Goodman et al. | |
| 7,739,231 B2 * | 6/2010 | Flinn et al. | 707/603 |
| 7,797,345 B1 | 9/2010 | Martino et al. | |
| 7,814,211 B2 | 10/2010 | Vernal et al. | |
| 7,818,392 B1 | 10/2010 | Martino et al. | |
| 7,831,670 B2 | 11/2010 | Goodman et al. | |
| 7,831,684 B1 | 11/2010 | Lawler et al. | |
| 7,890,581 B2 * | 2/2011 | Rao et al. | 709/204 |
| 7,908,317 B2 | 3/2011 | Musson | |
| 8,028,087 B2 | 9/2011 | Reed et al. | |
| 8,073,708 B1 * | 12/2011 | Igoe et al. | 705/2 |
| 8,224,359 B2 | 7/2012 | Marlow et al. | |
| 8,230,350 B2 | 7/2012 | Dodsworth | |
| 8,234,375 B2 * | 7/2012 | Ghadialy et al. | 709/225 |
| 8,341,162 B2 * | 12/2012 | Abercrombie et al. | 707/748 |
| 8,401,009 B1 * | 3/2013 | Dorsey et al. | 370/389 |
| 8,407,311 B1 * | 3/2013 | Behforooz et al. | 709/217 |
| 8,548,918 B1 * | 10/2013 | Amidon et al. | 705/51 |
| 8,572,221 B2 * | 10/2013 | Galbreath et al. | 709/223 |
| 8,621,215 B1 * | 12/2013 | Iyer | 713/169 |
| 2003/0095550 A1 | 5/2003 | Lewis et al. | |
| 2003/0125927 A1 | 7/2003 | Seme | |
| 2003/0172077 A1 | 9/2003 | Moussavian | |
| 2003/0185232 A1 | 10/2003 | Moore et al. | |
| 2003/0195811 A1 | 10/2003 | Hayes, Jr. et al. | |
| 2003/0215067 A1 | 11/2003 | Ordille et al. | |
| 2004/0024824 A1 * | 2/2004 | Ferguson et al. | 709/206 |
| 2004/0198386 A1 | 10/2004 | Dupray | |
| 2004/0229635 A1 | 11/2004 | Hertz | |
| 2004/0242239 A1 | 12/2004 | Hertz | |
| 2005/0048991 A1 | 3/2005 | Hertz | |
| 2005/0259652 A1 | 11/2005 | Tang et al. | |
| 2006/0242230 A1 | 10/2006 | Smith et al. | |
| 2008/0159206 A1 | 7/2008 | Smith et al. | |
| 2012/0089681 A1 | 4/2012 | Chowdhury et al. | |

* cited by examiner

DEVICE INDEPENDENT MESSAGE DISTRIBUTION PLATFORM

CROSS REFERENCE TO RELATED APPLICATIONS

This application is a continuation of U.S. patent application Ser. No. 12/177,589, filed on Jul. 22, 2008. U.S. patent application Ser. No. 12/177,589 claims the benefit of U.S. Provisional Application No. 60/951,415, filed on Jul. 23, 2007. U.S. Provisional Application No. 60/951,415 is hereby incorporated by reference in its entirety.

BACKGROUND

1. Field of Art

The disclosure generally relates to the field of electronic communications and more specifically, to distributing messages independently of the sending or receiving devices.

2. Description of the Re Art

Electronic communication is normally available only between similar devices or message types. When a user sends an e-mail message through an e-mail client, the sender specifies the e-mail addresses of the recipients and the message is delivered to the e-mail accounts of the recipients who retrieve the messages through e-mail clients. Similarly, a user will send a Short Message Service (SMS) message from a cell phone, specify the phone numbers of the recipients, and the recipients will view the message on their cell phones. Similar procedures are normally followed for Instant Messaging (IM) and Web-based communication (such as a web-based discussion forum).

While there is some ability to communicate between devices or message types, there are still significant limitations. For example, it is possible to send SMS messages from a web-based interface and it is possible to send SMS messages from a cell phone to an e-mail account. However, these features are often provider-specific (for example, a user often must go to a specific provider, e.g., Verizon, website to send SMS messages to that specific provider's mobile phone service, i.e., Verizon) and do not provide more generally useful cross-device communication capabilities. Also, a sender is still required to send to a particular receiving device or format of the receiver and the sender must know the appropriate address to send to. For example, instead of being able to send a message to a user and allow the user to receive the message however the user chooses (e-mail, IM, or SMS), the sender must specify the method of receipt and the corresponding address (for example, SMS with a phone number).

Additionally, there is no general method of sending a message to multiple users who may be receiving the same message using different devices or interfaces. For example, a user may want to send a message to three SMS recipients (all using different cell phone service providers), two e-mail recipients, and a web interface recipient.

In general, the current state of the art lacks, inter alia, a system and method for sending a message to multiple receivers where the sender and receivers are using different devices and interface, and where the sender does not need to have knowledge of the receiver's particular device and interface, or the receiver's address for the particular device and interface of choice.

SUMMARY

Disclosed is a system (and/or method) that includes, for example, a routing engine that receives a message from any of various entry points, including e-mail, short message service (SMS), instant messenger (IM), web input, and application programming interface (API) function calls. The routing engine determines the identities of the destination users to receive the message, possibly by expanding destination groups. The routing engine determines the endpoints on which the destination users wish to receive the message, the endpoints can be one or more of e-mail, SMS, IM, web input, and API function calls. The destination endpoints are independent of the source entry points, and the message sender does not need to have knowledge of the endpoints, or endpoint-specific user addresses. A single user can receive a message at multiple endpoints. The routing engine applies rules to the message to determine the actual destination endpoints for each user, translates the message as appropriate for each endpoint, and transmits the message to the endpoints, where the message is delivered to the destination user.

The system beneficially allows for device independent point to multipoint communication. The destination endpoints are independent of the source entry points, and the message sender does not need to have knowledge of the endpoints, or endpoint-specific user addresses. A receiving user controls that user's destination endpoint and receipt preferences. A message can be translated for improved viewing on a particular destination endpoint. Additionally, advertisements can be provided to users based on user activity in the system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Reference will now be made in detail to several embodiments, examples of which are illustrated in the accompanying figures (FIGS.). It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
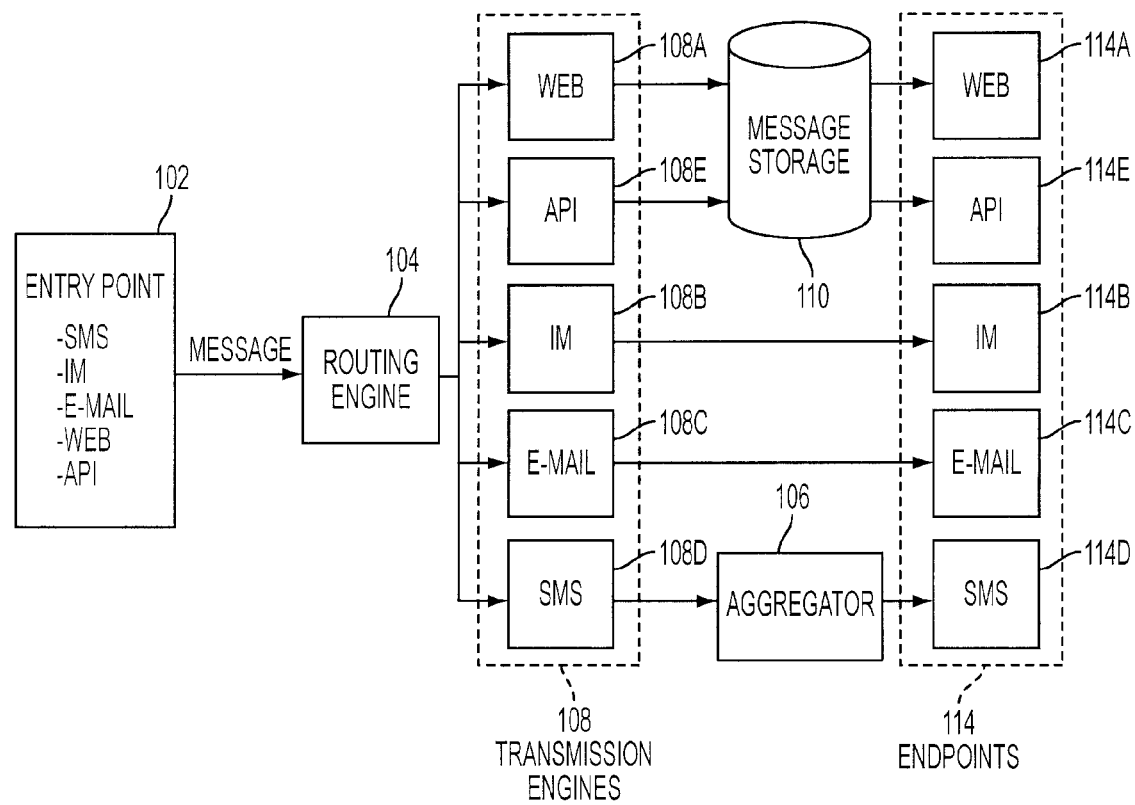
FIG. 1 illustrates one embodiment of an overall point to multipoint communication system.

FIG. 1 illustrates one embodiment of an overall point to multipoint communication system 100. The communication system 100 includes an entry point 102, a routing engine 104, a transmission engine 108, a message storage 110, an aggregator 106, and endpoints 114. The transmission engine 108 further includes a web transmission engine 108A, an application program interface (API) transmission engine 108E, an instant messaging (IM) transmission engine 108B, an e-mail transmission engine 108C, and a short messaging service (SMS) transmission engine 108D. The endpoints 114 further include a web endpoint 114A, an API endpoint 114E, an IM endpoint 114B, and e-mail endpoint 114C, and an SMS endpoint 114D.

The entry point 102 communicatively couples the routing engine 104. The routing engine communicatively couples the transmission engine 108. Specifically, the routing engine 104 couples with the web, API, IM, e-mail, or SMS transmission engines 108. The web and API transmission engines 108 couple with the web and API endpoints 114, respectively, through the mass storage 110. The IM and e-mail transmission engines 108 couple with the IM and e-mail endpoints 114, respectively. The SMS transmission engine 108D couples with the SMS endpoint 114D through the aggregator 106.

A user composes a message to be sent from an entry point (or initiating endpoint) 102. There are several possible devices and interfaces for sending a message, here referred to as entry points 102. One entry point is Short Messaging Service (SMS), where a user typically creates an SMS message on a cell phone. Another entry point is Instant Messaging (IM), where a user can be running an IM client such as Google Talk on a computer and the user composes the message in the IM client. Another entry point is E-mail, where a user composes a message to be sent by an e-mail client. Another entry point is the World Wide Web, or web, where a user visits a specific site or sites to compose a message and submit it through the site (for example, via a web form).

Another possible entry point 102 is through Application Program Interface (API) functions. An API allows creation of many additional types of interfaces for a user to compose and send a message. For example, a specialized application or website can be designed where the user can compose a message and the message is sent using an API function provided by the routing engine. Sample API functions are discussed further below.

Note that the entry point device 102 can be any computing device, for example, a cell (or mobile) phone, a laptop computer, desktop or server computer, or a specialized appliance having communication capability. The entry point can be different at each endpoint and need not be the same.

The routing engine 104 receives a message from an entry point 102 and determines where the message is to be sent. The routing engine may produce multiple copies of the message to be sent to multiple endpoints 114. The routing engine sends messages to the appropriate transmission engines 108 for delivery to the endpoints 114. The routing engine is described further below. The endpoints 114 represent the actual user devices and interfaces for receiving the message. The transmission engines 108 send messages to their respective endpoints 114. The transmission engines 108 may also send the messages to a storage 108 or aggregator 106, as described below, before the messages are received at the endpoint. The transmission engines 108 and endpoints are described further below.

A message can be sent by a user from an entry point 102 to multiple users at multiple endpoints 102. For example, suppose User1 sends an SMS message. This message can be received by User2 via e-mail and IM, received by User3 via SMS, and received by User4 by Web and IM. The endpoints at which a particular user receives messages is under control of the receiving user and is not of concern for the sending user. The system 100 beneficially allows a user from an entry point to send a message to multiple users at different endpoints by simply addressing the message to the users (or a group containing the users) without knowledge of the specific endpoints associated with the users.

Figure 2:
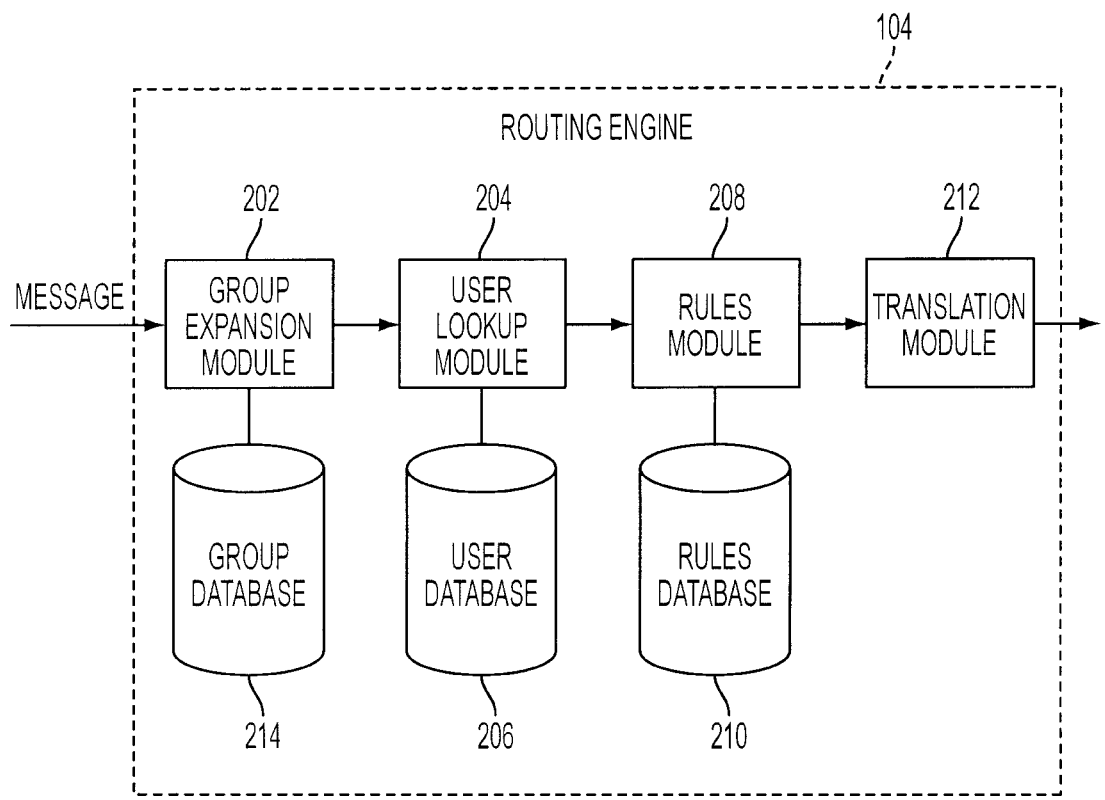
FIG. 2 illustrates one embodiment of the routing engine in a multipoint communication system, for example, as shown in FIG. 1.

FIG. 2 illustrates one embodiment of the routing engine 104 in the system of FIG. 1. The routing engine 104 includes a group expansion module 202, a group database 214, a user lookup module 204, a user database 206, a rules module 208, a rules database 210, and a translation module 212.

The group expansion module 202 communicatively couples the group database 214 and the user lookup module 204. The user lookup module 204 also communicatively couples with the user database 206 and the rules module 208. The rules module 208 also communicatively couples with the rules database 210 and the translation module 212.

A message is received from the entry point 102 by the group expansion module 202. The group expansion module expands any group names in the addresses specified in the message. The group expansion module obtains group membership data from the group database 214.

A message can be addressed to a single other user, a list of other users, or a group name where the group includes one or more users. A group name can be, for example "Work," which includes multiple addresses from the user's workplace. Users can define groups and send these definitions to the routing engine 104 which stores them in the group database 214. Groups can be defined, for example, using a web or SMS based interface that communicates with the routing engine. The membership of a group can be controlled by a single user or by multiple users. In one embodiment, individual users can add themselves to or remove themselves from a group by sending appropriate "add" or "remove" messages to the routing engine.

In one embodiment, when a message is not addressed to any users or groups, the message is sent to a default group. Each user has a default group that is referred to as the FollowerGroup of the user. A message not addressed to any recipient in particular is considered an "update" message that is sent to the user's FollowerGroup. A user can choose to follow another user and receive that user's updates by joining that user's FollowerGroup, again possibly through a web or SMS interface that communicates with the routing engine and the group database 214. A user can restrict the membership of its FollowerGroup through a per-follower approval or blocking process.

After any groups or default groups are expanded to individual users, the message is received by the user lookup module 204. The message addresses specified by the user or expanded by the group expansion module are used only to identify the recipient users, not to specify the method of receipt. For example, a message can be addressed simply to the username "UserX" without specifying whether UserX is to receive the message through e-mail, SMS, IM, etc. The choice of method of receipt for each user is determined by the routing engine and the sender does not have knowledge of this. As a consequence, the sender does not need to know specific per-device addresses (which the recipient may wish to keep secret or otherwise may be unable to divulge), such as a cell phone number. However, optionally, the message can be given a device specific address such as a cell phone number if known. Such messages will still be delivered according to the recipient user's preferences, which may or may not include an SMS message sent to a cell phone. The delivery formats of a message to a particular user are independent of the type of address used to identify the user.

The user lookup module 204 looks up information for each recipient user to enable the user to receive the message. The routing engine uses this information to send the message to the appropriate endpoints for each user. The information includes each user's receiving preferences and device-specific receiving addresses, such as phone numbers. This information is stored in the user database 206. For example a user might specify that he or she wishes to receive messages through a web interface, through e-mail, and through SMS (i.e., a copy of each incoming message should be sent to each of those three endpoints for the user). This information would be stored in the user database along with that user's web interface login and password, the user's e-mail address, and the user's cell phone number and cell phone service provider. The endpoints at which a user is to receive messages can change over time by updates from the user or by devices being turned on or off. In this way, the messages can follow the user as the user moves from one device to another, rather than requiring the user to check multiple devices for messages.

The user may further have specified receipt preferences, such as when messages are to be received, the maximum number of messages, or special translation instructions. For example, the user may specify that only 10 e-mails are to be received per day, that SMS messages should only be received between 8:00 am and 10:00 pm, and that long URLs should be shortened. This information will also be stored in the user database. The user database is populated when users register with the system, as described below, and when users change their message receiving preferences, possibly through a web interface with the system.

The user lookup module 204 retrieves destination and receipt preference information for each recipient of the message and attaches this information to the message for further processing by the system. The message is received by the rules module 208, which applies rules to further determine where the message is to be sent. The rules module 208 processes the preferences specified by each recipient. For example, if a recipient specified that it wanted to receive at most 10 e-mails per day, the rules module would determine if this daily threshold has been reached. If it has been, then the message would not be sent by e-mail, and the rules module would remove the e-mail destination address for that recipient for this message.

The rules module 208 also applies global rules to the message and destination addresses. These global rules are specified in the rules database 210, which can be populated by a system administrator. Examples of global limits include a maximum number of messages that a user can send or receive per day or a maximum message length. Also, system wide limits can be imposed on messages. For example, a maximum number of SMS messages (sent by all users) to cell phones with Verizon service can be sent by the system per month. The rules module will enforce this rule, possibly by removing some Verizon SMS recipients from low priority messages when the number of messages is approaching the monthly limit.

Figure 3:
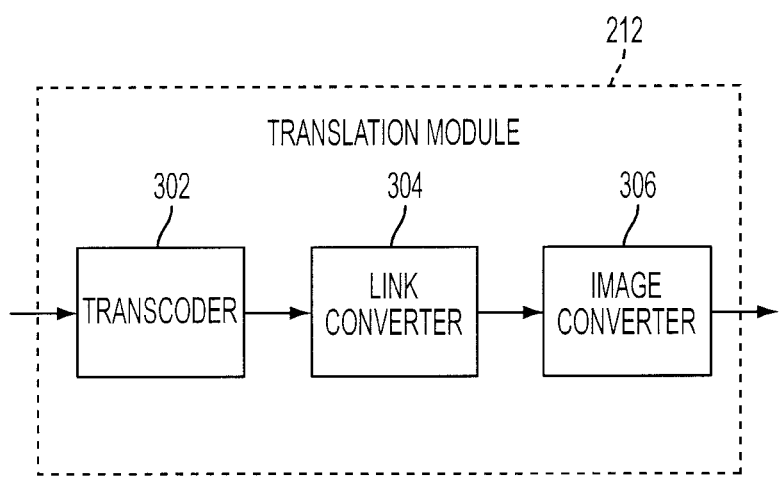
FIG. 3 illustrates one embodiment of the translation module in a routing engine, for example, as shown in FIG. 2.

The translation module 212 receives messages from the rules module 208 and processes the content of the messages based on the needs or preferences of the recipients. FIG. 3 illustrates one embodiment of the translation module 212. The translation module 212 modifies the body of the message so that it is compatible with and easy to view on the destination endpoint 114. Since a single message may be sent to multiple endpoints, the translation module may produce copies of the message, process them differently, and send the differently translated copies to different endpoints (e.g., one to IM recipients and one to SMS recipients).

The translation module 212 includes a transcoder 302, a link converter 304, and an image converter 306. The transcoder 302 communicatively couples with the link converter 304. The link converter 304 communicatively couples with the image converter 306.

The transcoder 302 converts the character encoding of the message, if necessary. For example, if the message is sent using SMTP e-mail and is encoded using ASCII while the SMS recipient prefers to receive messages encoded using the GSM 7-bit alphabet, the transcoder will convert the message. The encoding preference of a user can be automatically determined based on the device or interface on which the user will receive the message, or can be based on user supplied preferences. This information can be obtained from the user database 206.

The link converter 304 receives the message from the transcoder 302 and processes hyperlinks and uniform resource locators (URLs) in the body of the message. The link converter can convert a plain-text URL to an active link if the destination medium allows the user to follow active links, for example by clicking on them. The link converter can also convert an active link back to a plain text URL. The link converter can shorten a URL to minimize the length of the message at the destination. One way to do this is to replace the longer URL with a shorter one that redirects to the original URL. This is useful for SMS receivers, for example, because their devices may have small screens and maximum message length restrictions. The link converter can also expand a URL that has been shortened.

The image converter 306 can convert from a URL or link that points to an image to the image itself. For example, an SMS sender may include a link to an image in a message being sent to an e-mail receiver who is capable of reading e-mails with inline or attached images. The image converter will visit the link in the SMS message, obtain the image, and place it directly in an e-mail message to the recipient so that the recipient does not need to click on the link to view the image.

Next, the routing engine sends the message to the appropriate transmission engines 108 for transmission to the appropriate recipients. As described above, a single message may be sent to recipients at different endpoints, so that a single message may be routed to multiple transmission engines. The transmission engines 108 control when the message is actually sent from the system, and the engines may include queues to delay the sending of messages if necessary (for example, the receiving system is currently overloaded).

The web transmission engine 108A sends messages to a web interface so that the receiving user can log into a website and view the messages. The web transmission engine stores messages in a message storage 110 that the receiving user can access. Other users can access messages designated as publicly viewable in the message storage. Additionally, an Application Program Interface (API) 112 function can access the message storage to retrieve messages. In one embodiment, a user can request a particular web page and view all of the messages the user has recently received. Additionally, a user can request various web pages that display all of the messages sent by other users that the requesting user has permission to view. For example, a user-specific web page may contain all messages sent to that user's FollowerGroup, and any of the user's followers can view that page.

In one embodiment an API can be used to send messages from an entry point 102 or retrieve messages at an endpoint 114. API functions are provided by the routing engine 104 and transmission engine 108E. Applications, for example with specialized graphical interfaces, can be developed using the API for interacting with the routing engine and transmission engines. Some API functions may require authentication, for example to ensure that a user is retrieving messages that only that user is permitted to retrieve.

The following are examples of API functions, in one embodiment:

public_timeline—Returns the 20 most recent messages from users who allow their messages to be publicly viewed
user_timeline—Returns the 20 most recent messages from a particular user (may require authentication).
show—Returns a single message, specified by an identification parameter.
update—Post an "update", which is a message sent to the followers (i.e., the members of the FollowerGroup) of a user
followers—Returns the members of the FollowerGroup of a user.

The IM transmission engine 108B sends messages to an appropriate IM network, such as Google Talk, which then sends the message to the destination user via an IM client. The IM transmission engine 108B can send the message via XML.

The e-mail transmission engine 108C sends messages via SMTP (simple mail transfer protocol) (or any other appropriate electronic mail protocol) to an appropriate destination e-mail server. The e-mail transmission engine 108C also can be configured to function with, for example, a messaging application programming interface (MAPI).

The SMS transmission engine 108D sends messages to an aggregator 106. The SMS transmission engine can send messages using XML or SMPP. The aggregator sends SMS messages, often in bulk, to various SMS service providers that then send the messages to the devices of individual users. The aggregator can queue messages before sending them to an SMS service provider.

In one embodiment, messages are dropped if they cannot be delivered. For example, if a user is not logged into an IM client, any messages sent to this endpoint are dropped, though the messages may still be delivered to other endpoints. In another embodiment, such messages are queued until they can be delivered. Alternatively, the messages can be diverted to another endpoint where they can be retrieved later. For example, SMS messages that cannot be delivered can be sent to a web endpoint.

A user registers with the system so that the user can send and receive messages. The registration process can be completed over a single entry point so that, for example, a user can fully register by sending SMS messages to the system without ever having to access a system website. A user can send a registration message to the system either specifying a username or asking the system to generate a username. The system stores the user's contact information (such as a cell phone number) and username and registers the user. The system sends back an acknowledgement, possibly including a generated username. The user can register to receive updates from (i.e., to "follow") other specified users and can otherwise configure his or her account with the system by sending configuration messages in specified formats to the system. A configuration message can contain, for example, message receipt preferences. In one embodiment, a new user is automatically registered with the system when the new user either joins a group (such as a followers group) or sends a message. The new user can be given a system-generated username and an account with default preferences.

Users may tend to follow other users with similar interests, resulting in communities of users with similar interests. For example, if users A, B, and C have a similar interests, A may follow B and C, B may follow A and C, and C may follow A and B. As a result, A, B, and C will have formed a community of users. Not all members of a community need to follow each other, but a community generally has users frequently sending messages to each other.

Advertisements can be shown to users in sync with messages and can be targeted to the types of messages a user is receiving. Additionally, the advertisement can take into account other information, such as the device being used by the user, the location of the user, the time and date, and the current activity of other users connected to the user. An advertiser can also collect user data for analysis or market research purposes.

Commercial accounts can be created with a third party where the third party (such as third-party content generators ESPN® or MTV®) provides a specialized interface or content for users. For example, the commercial account can include special artwork and messaging features, or can provide the first notification of a new product release to their customers. Users in a community can follow certain notification services to keep them aware of community developments. Community members can interact by having community members follow their updates and by directly sending messages to various community services, such as community votes.

Activity in the community enables a commercial account owner or advertiser to determine what's currently of interest to the community (e.g., the "buzz"). Advertisements and community services can be modified based on the activity of users in the community. Searches can be conducted in message archives to mine for data and perform various market research analyses.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a device independent communications platform. Thus, while particular embodiments and applications have been illustrated and described, it is to be understood that the disclosure is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method of message distribution, comprising:
   receiving, from a first computing device of a first user, a selection of a plurality of endpoints for receiving messages, wherein the first user is one of a plurality of users who are followers of a second user;
   storing the selection of the plurality of endpoints in a storage;
   receiving, from a second computing device of the second user, a message for distribution to one or more unspecified recipients;
   identifying, by a computer processor, the followers of the second user as recipients of the message;
   identifying, in the storage, the plurality of endpoints selected by the first user; and
   sending the message to the followers of the second user, including the first user, wherein the sending includes sending the message to each of the plurality of endpoints selected by the first user.

2. The method of claim 1, wherein the second user is one of a plurality of users who are followers of the first user, and wherein the second user receives messages sent to followers of the first user, and wherein the plurality of endpoints comprises e-mail, short messaging service (SMS), and web.

3. The method of claim 1, further comprising:
   receiving, from the first computing device, an SMS registration message requesting creation of a new account of the first user;
   creating the new account in response to receiving the SMS registration message; and
   sending, to the first computing device, an acknowledgement message indicating that the new account is created, wherein the plurality of endpoints is associated with the new account in the storage.

4. The method of claim 1, further comprising:
   receiving, from the first computing device, an SMS message requesting to join the plurality of users who are followers of the second user; and
   adding the first user to the followers of the second user in response to receiving the SMS message.

5. The method of claim 1, further comprising:
   receiving, from the first computing device of the first user, an SMS configuration message comprising a plurality of message receipt preferences, wherein the sending of the message to the first user is based on the plurality of message receipt preferences.

6. The method of claim 5, wherein the plurality of message receipt preferences comprises a time window for receiving messages, and wherein the method further comprises:
   making a determination that a current time is within the time window for receiving messages, wherein the sending of the message to the first user is based on the determination.

7. The method of claim 5, wherein the plurality of message receipt preferences comprises a maximum number of update messages for a predefined time period, and wherein the method further comprises:
   identifying a current number of messages for the predefined time period; and
   making a determination that the current number of messages is less than the maximum number of messages, wherein the sending of the message to the first user is based on the determination.

8. The method of claim 1, further comprising:
   identifying a hyperlink within the message; and
   displaying the hyperlink to the first user as an active link, wherein the active link comprises a shortened representation of the hyperlink.

9. The method of claim 1, further comprising:
   identifying, within the message, a reference to an image; and
   displaying, to the first user, the message with an indication of the image.

10. The method of claim 1, further comprising:
    detecting that an overload threshold is exceeded;
    storing the message in a delay queue in response to detecting that the overload threshold is exceeded;
    detecting that the overload threshold is no longer exceeded; and
    retrieving the message from the delay queue in response to detecting that the overload threshold is no longer exceeded, wherein the sending of the message is in response to detecting that the overload is no longer exceeded.

11. The method of claim 1, further comprising:
    determining that a maximum number of short message service (SMS) messages for a predefined time period is exceeded; and
    removing a plurality of low priority followers of the second user as recipients of the message in response to determining that the maximum number of SMS messages is exceeded.

12. The method of claim 1, further comprising:
    receiving, from the first computing device, a selection of an alternate endpoint for receiving undeliverable messages;
    determining that the message is undeliverable to an endpoint of the plurality of endpoints; and
    sending the message to the alternate endpoint in response to determining that the message is undeliverable.

13. A message distribution system, comprising:
    a computer processor;
    a routing engine executing on the computer processor and configured to:

receive, from a first computing device of a first user, a selection of a plurality of endpoints for receiving messages, wherein the first user is one of a plurality of users who are followers of a second user;
store the selection of the plurality of endpoints in a data repository;
receive, from a second computing device of the second user, a message for distribution to one or more unspecified recipients;
identify the followers of the second user as recipients of the message; and
identify, in the data repository, the plurality of endpoints selected by the first user; and
a transmission engine configured to send the message to the followers of the second user, including the first user, wherein the transmission engine sends the message to each of the plurality of endpoints selected by the first user.

14. The message distribution system of claim 13, wherein the second user is one of a plurality of users who are followers of the first user, and wherein the second user receives messages sent to followers of the first user.

15. The message distribution system of claim 13, wherein the routing engine is further configured to:
receive, from the first computing device, an SMS registration message requesting creation of a new account of the first user; and
create the new account in response to receiving the SMS registration message, and
wherein the transmission engine is further configured to send, to the first computing device, an acknowledgement message indicating that the new account is created, wherein the plurality of endpoints is associated with the new account in the data repository.

16. The message distribution system of claim 15, wherein the routing engine is further configured to receive, from the first computing device, an SMS message requesting to join the plurality of users who are followers of the second user, and wherein the message distribution system further comprises a group expansion module configured to:
add the first user to the followers of the second user in response to receiving the SMS message.

17. The message distribution system of claim 13, wherein the message distribution system further comprises a rules module configured to:
identify, for the first user, a plurality of message receipt preferences comprising a time window for receiving messages; and
make a determination that a current time is within the time window for receiving messages, wherein the sending of the message to the first user is based on the determination.

18. The message distribution system of claim 13, further comprising:
a rules module configured to:
determine that a maximum number of short message service (SMS) messages for a predefined time period is exceeded; and
remove a plurality of low priority followers of the second user as recipients of the message in response to determining that the maximum number of SMS messages is exceeded.

19. The message distribution system of claim 13, wherein the routing engine is further configured to:
receive, from the first computing device, a selection of an alternate endpoint for receiving undeliverable messages;
determine that the message is undeliverable to an endpoint of the plurality of endpoints; and
send the message to the alternate endpoint in response to determining that the message is undeliverable.

20. A non-transitory computer readable medium comprising a plurality of instructions for message distribution, the plurality of instructions comprising functionality to:
receive, from a first computing device of a first user, a selection of a plurality of endpoints for receiving messages, wherein the first user is one of a plurality of users who are followers of a second user;
store the selection of the plurality of endpoints in a storage;
receive, from a second computing device of the second user, a message for distribution to one or more unspecified recipients;
identify the followers of the second user as recipients of the message;
identify, in the storage, the plurality of endpoints selected by the first user; and
send the message to the followers of the second user, including the first user, wherein the sending includes sending the message to each of the plurality of endpoints selected by first user.

21. A message distribution system for distributing messages, the message distribution system comprising:
a computer processor;
a routing engine executing on the computer processor and configured to:
receive, from a first computing device of a first user, a request for joining a follower group of users following a second user;
in response to receiving the request for joining, store information about the first user in a data repository for storing follower group information about the follower group of users;
receive, from the first computing device of the first user, a selection of a plurality of endpoints for receiving messages, the plurality of endpoints including two or more of email, short messaging service (SMS) and web;
store selection information regarding the selection of the plurality of endpoints in the data repository;
receive, from a second computing device of the second user, a message for distribution to one or more unspecified recipients;
identify, based on the stored follower group information, the users in the follower group as recipients of the message; and
identify, based on the stored selection information, the plurality of endpoints selected by the first user; and
a transmission engine configured to send the message to each of the users in the follower group, including the first user, wherein the transmission engine is configured to send the message to each of the plurality of endpoints selected by the first user.

* * * * *